(12) United States Patent
Burckard

(10) Patent No.: US 11,710,971 B2
(45) Date of Patent: *Jul. 25, 2023

(54) SYSTEM AND METHOD FOR CONTROLLING OPERATION OF CONSUMPTION APPLIANCES

(71) Applicant: Nagravision S.A., Cheseaux-sur-Laussane (CH)

(72) Inventor: Antoine Burckard, Montigny le Bretonneux (FR)

(73) Assignee: Nagravision S.A., Cheseaux-sur-Laussane (CH)

( * ) Notice: Subject to any disclaimer, the term of this patent is extended or adjusted under 35 U.S.C. 154(b) by 64 days.

This patent is subject to a terminal disclaimer.

(21) Appl. No.: 17/523,324

(22) Filed: Nov. 10, 2021

(65) Prior Publication Data

US 2022/0069589 A1 Mar. 3, 2022

Related U.S. Application Data

(63) Continuation-in-part of application No. 17/478,532, filed on Sep. 17, 2021, now abandoned, which is a
(Continued)

(30) Foreign Application Priority Data

Sep. 2, 2011 (EP) ..................................... 11179835

(51) Int. Cl.
*G05D 3/12* (2006.01)
*G05D 5/00* (2006.01)
(Continued)

(52) U.S. Cl.
CPC .............. *H02J 4/00* (2013.01); *H04L 12/282* (2013.01); *H04L 12/2827* (2013.01)

(58) Field of Classification Search
CPC ...... H02J 3/14; H02J 2310/14; H02J 2310/16; H02J 2310/64; H02J 7/35; H02J 9/005;
(Continued)

(56) References Cited

U.S. PATENT DOCUMENTS 5,642,101 A 6/1997 Stirk et al.
5,761,083 A 6/1998 Brown, Jr. et al.
(Continued)

FOREIGN PATENT DOCUMENTS

WO WO-2009137654 A1 11/2009

OTHER PUBLICATIONS

Brazilian Office Action published on Apr. 14, 2020, in Patent Application No. BR112014004379-5, 7 pages (with English translation).
(Continued)

*Primary Examiner* — Zhipeng Wang
(74) *Attorney, Agent, or Firm* — Oblon, McClelland, Maier & Neustadt, L.L.P.

(57) ABSTRACT

A method is disclosed for controlling the operating of a consumption appliance by way of a selector switch controlled by an energy saving device connected to a management center. The consumption appliance is kept in its default power mode, until receiving, by the energy saving device, an authentic secured control message sent by the management center. This message includes a command onto the mode in which the consumption appliance has to be switched. A counter is initialized with an initialization value before to be triggered. The consumption appliance is switched in the mode indicated by the command, either until the counter has reached a threshold value, or until receiving another authentic control message. If the counter has reached the threshold value, then the consumption appliance is switched in its default power mode. If another authentic secured control
(Continued)

message has been received, then returning to the step of initializing the counter.

20 Claims, 1 Drawing Sheet

Related U.S. Application Data continuation of application No. 16/106,304, filed on Aug. 21, 2018, now Pat. No. 11,152,792, which is a continuation of application No. 14/240,851, filed as application No. PCT/EP2012/066815 on Aug. 30, 2012, now Pat. No. 10,074,991.

(60) Provisional application No. 61/530,405, filed on Sep. 2, 2011.

(51) Int. Cl.
*G05D 9/00* (2006.01)
*G05D 11/00* (2006.01)
*G05D 17/00* (2006.01)
*H02J 4/00* (2006.01)
*H04L 12/28* (2006.01)

(58) Field of Classification Search
CPC ... Y02B 70/3225; Y02B 70/30; Y04S 20/222; Y04S 20/20; Y04S 20/242; Y04S 50/10; H05B 1/0266; F24C 3/128; G06Q 50/06; H04L 12/10; H04L 12/12; H04L 69/04; Y02D 30/50

See application file for complete search history.

(56) References Cited

U.S. PATENT DOCUMENTS

| | | | |
|---|---|---|---|
| 6,990,395 | B2 | 1/2006 | Ransom et al. |
| 8,463,448 | B2 * | 6/2013 | Burt .................... H05B 1/0266 700/286 |
| 2004/0153170 | A1 | 8/2004 | Santacatterina et al. |
| 2005/0065742 | A1 | 3/2005 | Rodgers |
| 2009/0062970 | A1 | 3/2009 | Forbes, Jr. et al. |
| 2010/0094470 | A1 | 4/2010 | Besore et al. |
| 2010/0161148 | A1 | 6/2010 | Forbes, Jr. et al. |
| 2010/0235008 | A1 | 9/2010 | Forbes, Jr. et al. |
| 2011/0040785 | A1 | 2/2011 | Steenberg et al. |
| 2011/0071696 | A1 | 3/2011 | Burt et al. |
| 2011/0148390 | A1 * | 6/2011 | Burt .................... H05B 1/0266 323/318 |
| 2011/0150521 | A1 | 6/2011 | Uchiyama et al. |
| 2011/0196547 | A1 * | 8/2011 | Park .......................... H02J 3/14 700/296 |
| 2011/0264286 | A1 * | 10/2011 | Park ....................... H04L 12/12 700/286 |
| 2011/0290781 | A1 * | 12/2011 | Burt ....................... F24C 3/128 219/396 |
| 2012/0265586 | A1 | 10/2012 | Mammone |
| 2015/0118630 | A1 | 4/2015 | Ewell et al. |

OTHER PUBLICATIONS

International Search Report PCT/ISA/210 for International Application No. PCT/EP2012/066815 dated Sep. 30, 2012.
Written Opinion of the International Searching Authority PCT/ISA/237 for International Application No. PCT/EP2012/066815.
Christophe-J., "Energy Efficiency and Intelligent Buildings", CBA conference, Cambridge, May 2006. 23 pages.

* cited by examiner

SYSTEM AND METHOD FOR CONTROLLING OPERATION OF CONSUMPTION APPLIANCES

INCORPORATION BY REFERENCE

This application is a continuation in part of and claims priority under 35 U S C. § 120 to U.S. patent application Ser. No. 17/478,532, filed on Sep. 17, 2021, which is a continuation of U.S. patent application Ser. No. 16/106,304, filed on Aug. 21, 2018, which is a continuation of U.S. patent application Ser. No. 14/240,851, filed on May 30, 2014, which is a national phase under 35 U.S.C. § 371 of PCT International Application No PCT/EP2012/066815 which has an international filing date of Aug. 30, 2012, which designated the United States of America, and which claims priority to European patent Application No. EP 11179835.1 filed Sep. 2, 2011, and to U.S. Provisional Patent Application No. 61/530,405 filed Sep. 2, 2011, the entire contents of each of which are hereby incorporated herein by reference.

TECHNICAL FIELD

This invention relates to the field of smart grids and aims to save the energy by controlling the supplying of energy to consumption appliances such as electrical devices of individual, commercial or industrial customers. Although, the present invention will be described hereafter in connection with electric power load, it should be understood that other kind of energy or loads that can be metered by a utility meter, such as gas or water, could be taken into account in this invention.

BACKGROUND

In the context of energy saving and optimization, it becomes of interest to utility providers or any other organizations, to be able to control energy use. The need for limiting consumption can be often predicted in advance since peak usage is usually predictable, for instance by comparing past usages and/or by anticipating on the temperatures of the next days. Some usages may be seen as less critical than others and could be temporarily set in a lower consumption mode, typically in case of energy shortage risk. For instance, enforcing heating system to not heat over a temperature of 18° or 20°, or enforcing washing machine to delay its start could be possible solutions.

For customers that consume large amounts of power, the process for limiting consumption can be made manually, by contacting the clients and by recommending to lower the power loads. However, such a practice is laborious and slow. Moreover, voluntary reduction of power loads is often insufficient and compulsory reductions become necessary when power utility companies are temporarily not able to fully supply the electrical power demands for all users during peak usages.

Today, owing to smart grids, automatic measure for limiting power consumption can be achieved, for instance by sending "On" or "Off" messages (respectively to an active and to an inactive state) to an electric appliance connected to such a smart grid. However, some people may want to block such messages to circumvent the feature so that they are not bothered with service reduction. A possible solution against such actions could be to ask the devices to acknowledge the requests for disabling, but this leads to scalability issues with complicated handling on the server side and multiplication of upstream messages that may overload the network. Furthermore, acknowledgement of compulsory request could be also tampered by sending a fraudulent acknowledgement message.

The document US 2009062970 suggests such a system for managing consumption of power supplied by an electric utility to power devices of clients. The system includes a server storing information relating to power consumed by these devices. When a power reduction is requested by the utility, the server selects, on the basis of this information, at least one client device to which to issue a power reduction message by means of a "Turn Off" message. Once the power reduction is no more necessary, the power consuming devices have to receive a "Turn On" message in order to be switched back on. Acknowledgement message is sent to the server in order to confirm that the transaction has ended.

The document US 2005065742 discloses another system for remote power management using a wireless communication link. The system comprises three main components, i.e. the end device (e.g. an air-conditioning device), an energy management host processor acting as a host server and an access point ensuring the wireless communications between the end device and the host server. This access point could be a smart power meter. For example, the latter may transmit, to the end device, a command to deactivate a load. After having recognized the message, the device processes the instruction in order to disabled the appliance. Besides, the energy management of this system includes utility meter reading. The host server is typically a large-scale server capable of processing simultaneous communication with numerous remote end devices. It can record the status as to whether a utility meter is active or inactive. For example, a utility meter may be shut off to disconnect power when a residence is vacated. The host server is also able to request the access point to poll the end device in view to get energy status indications. Alternatively, the access point can communicate with the host server by using the power line infrastructure as physical medium for transferring data. This document does not teach any specific manner for preventing the system against people wanting to block command messages nor against people seeking to skirt the suggested communication system.

The document US2011/196547 discloses an energy management system providing power saving function for controlling power of home appliances within the user area. To this end, this system is provided with an information receiving unit for receiving electric rates (e.g. from power company) through a smart grid network. With such information, a power control unit can automatically control several appliances, separately, by mea n s of a communication unit which connects the home appliances to the energy management system within the user area. At any time, the user can switch any appliance from a power saving mode into a manual mode by means of a user command. Accordingly, the suggested system is not a restrictive system for the user since the latter can switch at any time one or several appliances in the power mode of his choice.

SUMMARY

Embodiments of the present invention suggest a method and system for controlling the operating of consumption devices which overcome the afore-mentioned drawbacks.

The present invention relates to a method for controlling the operating of at least one consumption appliance by means of a selector switch which can be automatically controlled by an energy saving device. This energy saving device being connected to a management center which can command the consuming device of an end user so that this consuming device can be switched between several operating modes, in particular at least a power limited default mode and a free power mode. Preferably operating modes further comprise a standby mode. Thus, the consuming device can be switched e.g. from its default mode to its free mode, then from its free mode to its standby mode. Any switching combination can be achieved on the basis of these three modes but the power limited default mode is defined as being a low consumption mode. Typically, the standby mode can be used to delay the start of the consuming device (e.g., a washing machine). The free mode is an unlimited power mode which allows the end user powering its consuming device according to its full potential, i.e. its entire power range. The default mode corresponds to a power limited mode which will be used to reduce the power consumption of an end user's appliance. Typically, the washing machine, a dryer or a hot water heater could be limited to a temperature of 45° C. instead of 60° C. during a critical period where consumption power must be reduced by the management center to avoid any energy supplying problem during a peak usage.

To this end, the method suggests that the appliance of the end user remains, by default, in a low consumption mode. The only way to leave this default mode is to receive an authentic message from the management center allowing to change its mode, e.g. to switch from the default mode to a free power mode. Such a message is received by the energy saving device which is in charge firstly to authenticate and to decrypt the message, before controlling the automated selector switch of the corresponding consuming device so as to execute the order contained in the message if the latter is recognized as authentic. By this means, the management center can set the behavior of the end user's device. According to the present invention, if the energy saving device does not receive any message within a given time period or if it receives a message with a wrong signature (i.e. a message which has been manipulated), the appliance of the end user automatically goes back to its limited power default mode, in accordance with a most stringent rule to save energy.

To this aim, the subject-matter of the present invention relates to a method for controlling the operating of at least one consumption appliance by means of an automated selector switch controlled by an energy saving device connected to a management center for switching said consumption appliance between several operating modes, namely at least a limited power default mode and a free power mode. The method comprising the steps of: (i) keeping (i.e. setting) the consumption appliance in its default power mode, until receiving, by the energy saving device, an authentic secured control message sent from a management center, said control message comprising a least a command onto the mode in which the consumption appliance has to be switched; (ii) then initializing a counter with an initialization value; (iii) triggering the counting of said counter; (iv) switching the consumption appliance in the mode indicated by the command comprised in the control message either until the counter has reached a predefined threshold value or until the energy saving device receives another authentic secured control message from the management center; (v) if the counter has reached said predefined threshold value, then switching the consumption appliance in its default power mode; (vi) if another authentic secured control message has been received, then returning to the step of initializing the counter.

Further advantages and embodiments of the present invention will be described in the following detailed description.

DETAILED DESCRIPTION OF EMBODIMENTS

Figure 1:
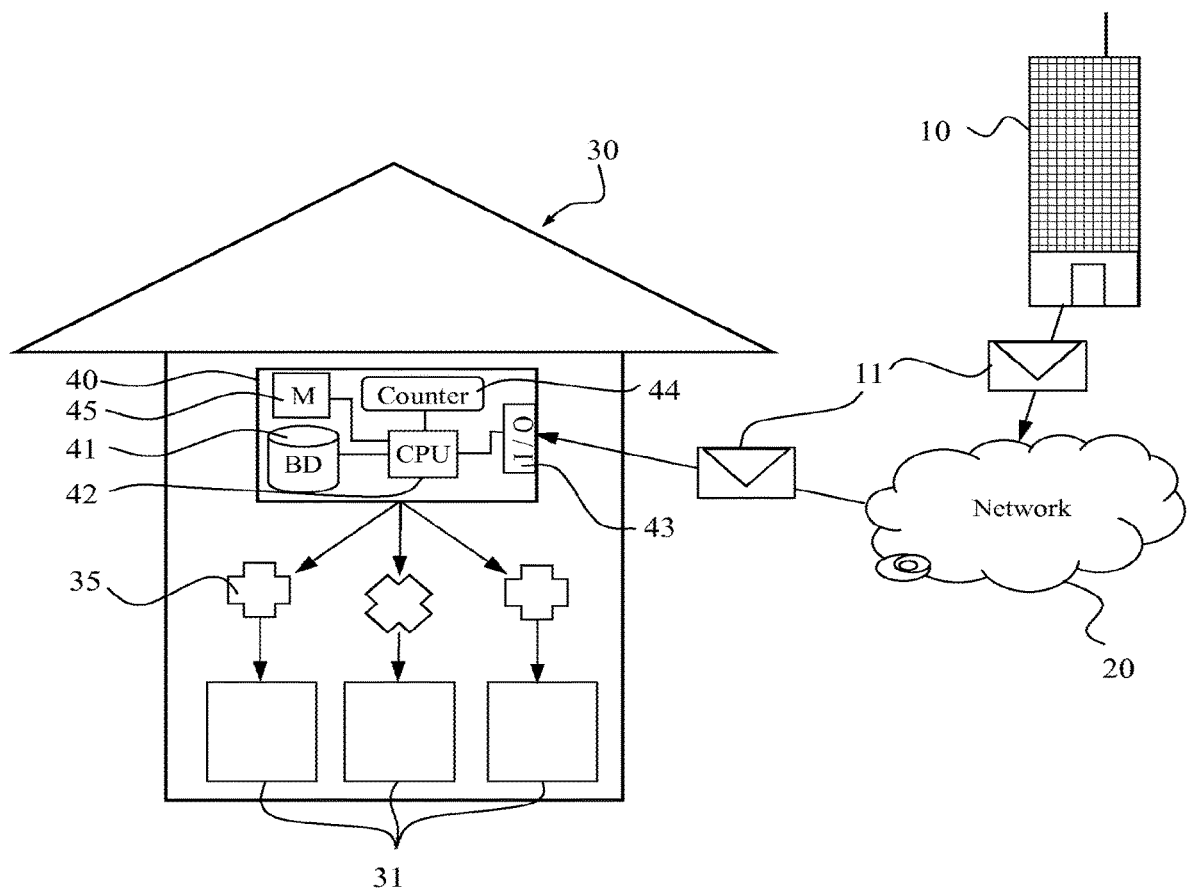
FIG. 1 is a block diagram showing devices used by a management center for controlling power consumption of appliances, located within an end user area, through an energy saving device which is able to drive automated selector switches.

Referring to FIG. 1, the latter discloses the main components acting in accordance with the present invention. This FIGURE discloses three main areas, namely a management center 10, a network 20 and an end user's area 30. The end user's area 30 comprises one or several consumption appliances 31. The operating of each of these appliances can be selected by means of an automated selector switch 35 which is driven by an energy saving device 40. This device 40 receives control messages 11 from the management center 10 through the network 20. The latter can be of any type such as ADSL, PLC (Power Line Carrier communication), 3G/4G network, etc. . . .

Each appliance 31 has a default mode corresponding to a low consumption power mode. In the absence of any control message 11 from the management center 10, the appliance 31 cannot be powered in another manner than its default mode. Consequently, all appliances can be kept in a low power consumption mode without any intervention from the manager center. In order to set an appliance into another operating mode, the energy saving device 40 has to receive an authentic secured control message from the management center. This means that each control message 11 sent by the management center 10 is encrypted and signed so that it becomes very difficult to tamper its content without nobody realizes that the original control message has been modified. To this purpose, common reliable encryption algorithms and/or software can be used. A step for verifying the authenticity of the control message is therefore achieved each time a message is received by the energy saving device 40. The implementation of such a verifying step could be conditioned by the insertion of a detachable module (e.g. smart card, SIM card, USB key, SD card, etc.) into a corresponding slot arranged in the energy saving device 40. Therefore, only the inserting of such a detachable module (comprising access rights) could make possible the verifying step.

The control message 11 includes at least a command or an instruction onto the mode in which the consumption appliance has to be set. This mode can be defined for instance by a predetermined value, such as 0 or 1 for defining respectively the power limited default mode and the free power mode, or by other values or at least an additional parameter (e.g. a value corresponding to a setting temperature) which could be used by the consumption appliance 31 (e.g. a dishwasher, a dryer, a washing machine, a heater, etc.), in order to set a particular operating mode. Typically, such value(s) and/or parameter(s) will be included in the aforementioned command. Preferably, this command further comprises an identifier ID31 for identifying to which consumption appliance 31 said command refers. Thus, the energy saving device 40 will know to which appliance 31 the incoming message is addressed. To this end, the energy saving device 40 can comprise a database 41 storing the identifiers ID31 of all the appliances which are put under its control. Other data can be stored in this database 41, in particular data such as addresses (e.g. IP addresses) which are useful for routing commands to a particular appliance. Alternately, such an address could be also used as the identifier ID31 of the consumption appliance 31. To easily manage the appliances 31, the energy saving device 40 comprises processor(s) 42 connected to the database 41 and to an interface 43 acting as a receiving device by which control messages 11 are received.

The method of the present invention is based on a one-way positive addressing in view to control the appliances of the end user. To this end, the energy saving device 40 also comprises a least one counter 44, preferably a counting unit which includes several counters, in particular one counter per appliance 31. When the command included in a control message 11 is ready to be processed, the counter 44 assigned to the appliance 31 to which this message is addressed is initialized with an initializing value. Such a value can be stored e.g. in the database 41, in connection with the identifier ID31 of the corresponding appliance. Alternately, the initializing value of the counter 44 could be retrieved from the command or information included in the control message 11. Once the counter has been initialized, its start is triggered by a trigger device within the energy saving device 40. The counting runs until the counter reaches a threshold value. Depending on the counter is a countdown or not, this threshold value could be zero or any other value. The threshold value can also be stored in the database 41 or be retrieved from the command or any information included in the control message 11.

Just after the counter has started, the consumption appliance 31 is switched in the operating mode indicated by the command included with the control message. This operating mode is kept either until the counter reaches the predefined threshold value or until a new authentic control message 11, addressed to the same appliance 31, is processed by the energy saving device 40. As soon as the counter 44 reaches the predefined threshold value, the energy saving device 40 activates the automated selector switch 35 so that the corresponding appliance 31 returns in its limited power default mode.

If a new authentic control message 11 addressed to this appliance is received before the counter has reached its threshold value, then the command included in the control message 11 is processed and the counter is reset with the initializing value. The latter can be either the same value as previously or can be a new initializing value different from the previous one.

From the foregoing, it should be understood that the appliance 31 is set and kept in its limited power consumption mode in the other cases.

According to the usual processing, the energy saving device 40 is processed as a slave device by the management center which can be considered as the master.

In an unusual processing, i.e. in case an unauthentic control message addressed to the appliance is received before the counter has reached its threshold value, then two possible actions can be undertaken depending on the configuration of the energy saving device 40. According to a first possibility, the unauthentic control message can be merely ignored. In a second way, receiving a tampered control message can immediately trigger the return of the appliance in its limited power default mode, even if the counter has not yet reached its threshold value. This second way of doing can be also applied at each time an unauthentic control message is received by the energy saving device 40.

According to the preferred embodiment, the energy saving device 40 is located within the area 30 of the end user. However, it could be possible to locate the energy saving device 40 outside the area 30, for instance within the network 20 while keeping a wired or wireless connection between the energy saving device 40 and the appliance 31, through the automated selector switch 35. Such a connection could be of any type, for instance Ethernet Home Network, PLC (Power Liner Carrier communication), Wi-Fi, etc. . . .

The automated selector switch 35 can be remotely controlled by the energy saving device 40, for instance by means of a wireless local communication. Alternately, the selector switch can be controlled by means of a wire line, in particular in case it is located on, into or close to the appliance that has to be controlled. Preferably, each appliance 31 has its own selector switch 35. However, it may be also possible to provide one automated selector switch 35 for more than one appliance.

In another embodiment, the energy saving device 40 could further send a warning message to the management center 10, e.g. through the network 20, if this device 40 is provided or combined with a sending unit for addressing messages through the interface 43 which can be an input/output interface. Information included in such a warning message could comprises the identifier ID 0 of the energy saving device 40, the identifier ID31 of the appliance to which the tampered control message has been addressed, date/time information and any other useful information. The sending address of the management center could be previously stored in a memory 45 of the energy saving device 40. In another embodiment, acknowledgement messages of each control message 11, or of a part of them, can be sent by the energy saving device 40 to the management center 10. In the same way as the warning message, the acknowledgement message can further comprise information which provides any useful data for the management center.

Advantageously, owing to the counting unit of the energy saving device 40, each appliance 31 of the end user is obligated to be set in its default mode at the end of a time period defined by the initializing value and/or the threshold value of the counter assigned to this appliance. The method of the present invention only allows the appliance to leave its default mode, in which this appliance is locked-on, by receiving a positive control message from the management center. That means that the automated selector switch 35 of the appliance 31 must receive a specific control signal from the energy saving device 40 to allow the appliance for changing its operating mode. Such a specific control signal could be an unpredictable signal, in particular an encrypted signal whose encryption is always different so as its signification cannot be recognized by a fraudulent person.

Therefore, to avoid any fraudulence, the energy saving device 40 will send a specific control signal to the automated selector switch 35. Several specific control signals can be used to identify which operating modes they correspond. Furthermore, the energy saving device 40 can send these signals through a wire or wireless secured communication link. In another embodiment, it should be possible to provide a specific energy saving device 40 for each appliance 31 and to include both this device 40 and the automated selector switch 35 in this appliance 31. Even if such an embodiment is more expensive, it could be attractive, e.g. for security reasons, to remove any physical distance between the energy saving device 40, the selector switch and the appliance. Further and according to any embodiment, the energy saving device 40 could be sealed, just after its installation, to make it impossible to open the energy saving device 40 without evidence of fraud.

According to another embodiment, the control message 11 may comprise several commands in view to control operating of several appliances 31 by means of one message only. Advantageously, the load and/or the traffic on the bandwidth due to sending control messages could be further lowered.

To maintain the appliance 31 in the free power mode (or in the standby mode) during a long time period, the management center 10 can define a large counting range for the counter, for instance by setting a big difference between the initializing value and the threshold value, or can act on the counting frequency of the counter in order to lower its counting speed. According to another way of doing, the management center 10 could renew the access to this operating mode by periodically sending a control message with the same instruction to the appliance.

The present invention also refers to a system for controlling the operating of at least one consumption appliance 31 by means of an automated selector switch 35 controlled by an energy saving device 40. The latter is connected to a management center 10 for switching said consumption appliance 31 between several operating modes, namely at least a limited power default mode and a free power mode. Switching from one operating mode to another is ordered by means of a control message 11 sent by the management center 10. According to the preferred embodiment of the invention, the control message is secured owing to at least one cryptographic key and in accordance with symmetric-key cryptography or asymmetric-key cryptography. Preferably, this control message is further signed by the management center 10. The energy saving device 40 comprises interface 43 for receiving the control message and processor(s) 42 for processing said control message. These processor(s) 42 are able to decrypt the control message and to verify the authenticity of the control message typically by using a signature attached to the control message or to its content. Specific devices could be defined to achieve such a task. These processor(s) 42 are also able to process the information contained in the control message. At least a part of this information is recognized, by the central processing unit, as being a command or instruction. This information may also comprise several commands.

The automated selector switch 35 is switchable from one operating mode to any other operating mode by means of a control signal sent from the energy saving device 40 to the automated selector switch 35. The energy saving device 40 comprises at least a counter 44 for counting a time interval during which the consumption appliance 31 is allowed to be switched in an operating mode different from its limited power default mode. The time interval can be counted for instance by counting electrical impulses of any frequency. The energy saving device 40 also comprises a memory 45 for storing at least a threshold value, an initializing unit for initializing the counter 44 with an initializing value, an incrementing/decrementing unit or any means for incrementing/decrementing the counter 44, a comparing unit or any means for comparing the current value of the counter 44 with the threshold value and a sending unit means for sending the control signal triggering the switching of the automated selector switch 35 from one operating mode to another one.

According to a preferred embodiment, the system comprises a database 41 for storing at least an identifier ID31 assigned to a consumption appliance 31. This database can be useful to store information, such as an identifier, a communication address or operating information about each appliance 31 that the energy saving device 40 is able to control. By this means, the load of the control messages 11 can be lowered and the processor(s) 42 can easily retrieve required recurrent data, such as communication address, about consumption appliances.

In order to ensure a safe communication between the energy saving device 40 and the appliance 31, or at least between the energy saving device 40 and the automated selector switch 35, the control signal is sent through a secured communication link. In an embodiment, the automated selector switch 35 is attached to the appliance 31, for instance it can be lodged within the appliance 31. In another embodiment, the automated selector switch 35 is located within the energy saving device 40. In another embodiment, the energy saving device 40 can be attached to the consumption appliance 31, for instance it can be located within the appliance 31.

In an embodiment, the enemy saving device 40 further comprises a sending unit for sending a warning message to the management center in response to a control message 11 defined as being corrupted by the processor(s) 42 of the energy saving device 40.

In some embodiments, the management center 10 can determine a time interval during which the consumption appliance 31 can work in a high power mode (the free power mode or the standby mode). For example, the management center 10 can send a message to allow the consumption appliance 31 to pass into the high power mode and allocate a time interval (e.g., 8 hours) for the consumption appliance 31 to operate in the high power mode. Accordingly, the threshold value of the counter 44 can be set to 8 hours. When the threshold value is reached, the selector switch 35 can switch the consumption appliance 31 into the power limited default mode.

In some embodiments, the energy saving device 40 can determine the time interval during which the consumption appliance 31 operates the high power mode. In an embodiment, if the energy saving device 40 detects that the high power mode is no longer needed for the consumption appliance 31, the energy saving device 40 can allow the selector switch 35 to switch the consumption appliance 31 into the power limited default mode.

For example, the management center 10 sends a message to allow the consumption appliance 31 to pass into the high power mode and allocate a time period (e.g., 8 hours) for the consumption appliance 31 to operate in the high power mode. The consumption appliance 31 is connected with an electrical device such as an electric car which can be charged through the consumption appliance 31. After a part of the allocated time period (e.g., after 6 hours), the electric car is fully charged. When the energy saving device 40 detects that the electric car is fully charged, for example by sensing the current drop or receiving a message from the consumption appliance 31, the selector switch 35 can switch the consumption appliance 31 into the power limited default mode and the energy saving device 40 can inform the management center 10, for example by sending a message to the management center 10, that the high power mode is no longer needed for the consumption appliance 31.

What is claimed is:

1. A method for controlling at least one consumption device via at least one selector switch controlled by an energy saving device connected to a management center for switching the at least one consumption device between at least a first power mode, in which power is limited, and a second power mode, the method comprising:
receiving, by the energy saving device, a control message sent from the management center, which is remote from the at least one consumption device, said control message comprising a command to switch the at least one consumption device into the second power mode;
in response to the receiving the control message by the energy saving device,
sending a message from the energy saving device to the at least one selector switch, which is remote from the energy saving device, to cause the at least one selector switch to switch the at least one consumption device into the second power mode;
based on the receiving of the control message, performing a triggering operation including triggering a counting from an initialization value of a counter included in the energy saving device;
in response to receiving by the at least one selector switch the message sent from the energy saving device,
switching, via the at least one selector switch, the at least one consumption device into the second power mode;
in response to the counter reaching a threshold value, switching, via the at least one selector switch, the at least one consumption device into the first power mode;
in response to receiving, by the energy saving device, another control message comprising the command to switch the at least one consumption device into the second power mode,
performing the triggering operation again; and
in response to detecting, by the energy saving device, that the at least one consumption device no longer consumes power in the second power mode,
switching, via the at least one selector switch, the at least one consumption device into the first power mode.

2. The method of claim 1, wherein said second power mode is a free power mode or a standby mode.

3. The method of claim 1, wherein the command of said control message sent from the management center includes an identifier for identifying a consumption device to be switched into the second power mode.

4. The method of claim 1, further comprising:
in response to the detecting by the energy saving device that the at least one consumption device no longer consumes power in the second power mode,
sending, by the energy saving device, a message to the at least one selector switch causing the at least one selector switch to return into the first power mode.

5. The method of claim 1, wherein the command of said control message sent from the management center includes at least one of said initialization value or said threshold value.

6. The method of claim 1, further comprising:
in response to the detecting by the energy saving device that the at least one consumption device no longer consumes power in the second power mode,
sending, by the energy saving device, a message to the management center informing of a termination of the second power mode for the at least one consumption device.

7. The method of claim 1, wherein said control message sent from the management center comprises at least two commands in order to control at least two consumption devices.

8. The method of claim 1, further comprising:
sending, by the at least one consumption device, a message to the energy saving device, the message indicating that the at least one consumption device no longer consumes power in the second power mode; and
determining, by the energy saving device, the at least one consumption device is to be switched into the first power mode.

9. The method of claim 1, wherein said control message received by the energy saving device from the management center is subsequently sent as the message from the energy saving device to the at least one selector switch through a secured wireless communication.

10. The method of claim 1, further comprising:
determining, by the energy saving device, a time interval during which the at least one consumption device is to operate in the second power mode.

11. The method of claim 1, further comprising:
in response to said control message being detected by the energy saving device as inauthentic or corrupted,
sending, by the energy saving device, a warning message to the management center.

12. The method of claim 2, wherein said standby mode is a mode in which the at least one consumption device is powered on, but the at least one consumption device is not functioning.

13. The method of claim 2, wherein said free power mode is an unlimited power mode.

14. A system for controlling at least one consumption device via at least one selector switch controlled by an energy saving device through a control signal, said energy saving device being configured to be connected to a management center for receiving a control message therefrom, to process said control message and to send said control signal to the at least one selector switch for switching, via the at least one selector switch, said at least one consumption device between at least a first power mode, in which power is limited, and a second power mode, the system comprising:
the energy saving device, including one counter configured such that the counter is initialized by the processing of the control message received from the management center, which is remote from the at least one consumption device, and
the counter counts a time interval, between an initializing value and a threshold value, during which the at least one consumption device is allowed to operate in a mode which is different from the first power mode,
the energy saving device being configured to (i) send said control signal to the at least one selector switch to cause the at least one selector switch, which is remote from the energy saving device, to switch the at least one consumption device from the second power mode into the first power mode in response to a current value of the counter reaching the threshold value and (ii) determine that the at least one consumption device is to be switched from the second power mode into the first power mode in response to detecting by the energy saving device that the at least one consumption device no longer consumes power in the second power mode.

15. The system of claim 14, further comprising:
a database for storing at least an identifier assigned to each of said at least one consumption device.

16. The system of claim 14, wherein the energy saving device is configured to inform the management center of a termination of the second power mode for the at least one consumption device.

17. The system of claim 14, wherein the at least one consumption device is configured to inform the energy saving device that the at least one consumption device no longer consumes power in the second power mode.

18. The system of claim 14, wherein the energy saving device is connected to the at least one consumption device via a secured communication link.

19. An energy saving device for controlling at least one consumption device by sending a control signal to a selector switch assigned to said at least one consumption device, said selector switch defining a first power mode, in which power is limited, and a second power mode, and said energy saving device being configured to receive and to process a control message and to send a control signal to the selector switch to switch, via said selector switch, the at least one consumption device from the first power mode to the second power mode, the energy saving device comprising:

a counter configured such that the counter is initialized by the processing of the control message, which is received from a management center, which is remote from the at least one consumption device, and the counter counts a time interval between an initializing value and a threshold value, during which the at least one consumption device is allowed to operate in the second power mode, said energy saving device being configured to (i) send a command to the selector switch to cause the selector switch to switch the at least one consumption device from the second power mode into the first power mode in response to a current value of the counter reaching the threshold value; and (ii) determine that the at least one consumption device is to be switched from the second power mode into the first power mode in response to detecting by the energy saving device that the at least one consumption device no longer consumes power in the second power mode.

20. The energy saving device of claim 19, wherein the energy saving device is further configured to reset the counter with said initializing value so as to terminate said time interval if said counter reaches said threshold value or if another control message from the management center is received by the energy saving device.

* * * * *